US009373276B2

(12) United States Patent
Choi

(10) Patent No.: US 9,373,276 B2
(45) Date of Patent: Jun. 21, 2016

(54) LED BLOCK DISPLAY APPARATUS FOR PROVIDING EDUCATIONAL FUNCTION AND CONTROL METHOD THEREOF

(71) Applicant: CONSTANTEC CO., LTD., Siheung-si, Gyeonggi-do (KR)

(72) Inventor: Woon-Yong Choi, Dangjin-si (KR)

(73) Assignee: CONSTANTEC CO., LTD., Siheung-Si, Gyeonggi-Do (KR)

( * ) Notice: Subject to any disclaimer, the term of this patent is extended or adjusted under 35 U.S.C. 154(b) by 0 days.

(21) Appl. No.: 14/386,297

(22) PCT Filed: Oct. 17, 2012

(86) PCT No.: PCT/KR2012/008463
§ 371 (c)(1),
(2) Date: Sep. 18, 2014

(87) PCT Pub. No.: WO2013/141455
PCT Pub. Date: Sep. 26, 2013

(65) Prior Publication Data
US 2015/0049005 A1  Feb. 19, 2015

(30) Foreign Application Priority Data

Mar. 21, 2012  (KR) ........................ 10-2012-0028700

(51) Int. Cl.
*G09G 3/20* (2006.01)
*G06F 3/041* (2006.01)
*G09G 3/32* (2016.01)

(52) U.S. Cl.
CPC .............. *G09G 3/2003* (2013.01); *G06F 3/041* (2013.01); *G09G 3/32* (2013.01); *G09G 2300/026* (2013.01); *G09G 2354/00* (2013.01)

(58) Field of Classification Search
CPC ......... G09G 3/2003; G09G 3/32; G06F 3/041
See application file for complete search history.

(56) References Cited

U.S. PATENT DOCUMENTS 5,995,070 A * 11/1999 Kitada ..................... G09G 3/32
345/83
2005/0052406 A1* 3/2005 Stephanick ........... G06F 3/0236
345/156

(Continued)

FOREIGN PATENT DOCUMENTS

JP          5643672 A    4/1981
JP       2005049387 A    2/2005

(Continued)

OTHER PUBLICATIONS

Machine translation of KR10-2010-0123934 originally cited by applicant.*

(Continued)

*Primary Examiner* — Christopher E Leiby
(74) *Attorney, Agent, or Firm* — Hauptman Ham, LLP

(57) ABSTRACT

According to one embodiment of the present invention, an LED block display apparatus for providing an educational function comprises: a plurality of LED blocks that include a plurality of color LEDs; and a controller for providing a text completion function using the LED blocks. The controller transmits a text display signal for displaying glow text to the LED blocks so that the text can be displayed as being glow by the LED blocks. When the LED block related to the text display signal is clicked, the controller transmits a first color change signal for changing color to the clicked LED block, and outputs a notification signal when colors of the LED blocks related to the text display signal are all changed.

11 Claims, 12 Drawing Sheets

(56) References Cited

U.S. PATENT DOCUMENTS

| | | | | |
|---|---|---|---|---|
| 2007/0117073 | A1* | 5/2007 | Walker | G09B 1/36 434/236 |
| 2010/0103131 | A1* | 4/2010 | Segal | G06F 3/041 345/173 |
| 2010/0248203 | A1* | 9/2010 | Cho | G09B 5/02 434/308 |
| 2011/0260964 | A1* | 10/2011 | Mujkic | G06F 3/0481 345/156 |
| 2012/0149001 | A1* | 6/2012 | Dohring | G09B 7/06 434/365 |

FOREIGN PATENT DOCUMENTS

| | | |
|---|---|---|
| KR | 10-2009-0035877 A | 4/2009 |
| KR | 100915118 B1 | 9/2009 |
| KR | 10-2010-0135695 A | 12/2010 |
| KR | 10-2010-0137592 A | 12/2010 |
| KR | 101020972 B1 | 3/2011 |
| WO | 2005038749 A2 | 4/2005 |

OTHER PUBLICATIONS

International Search Report for PCT/KR2012/008463 mailed on Jan. 30, 2013.
Supplementary European Search Report dated Dec. 4, 2014.
Japanese Office Action dated Oct. 30, 2015 in connection with the counterpart Japanese Patent Application No. 2015-501555.

* cited by examiner

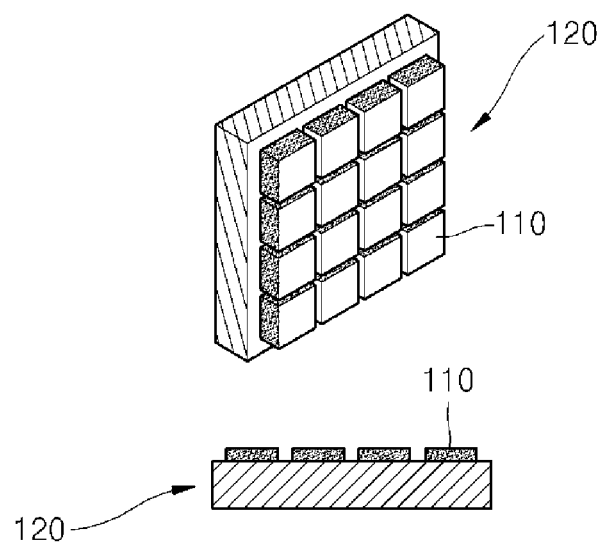

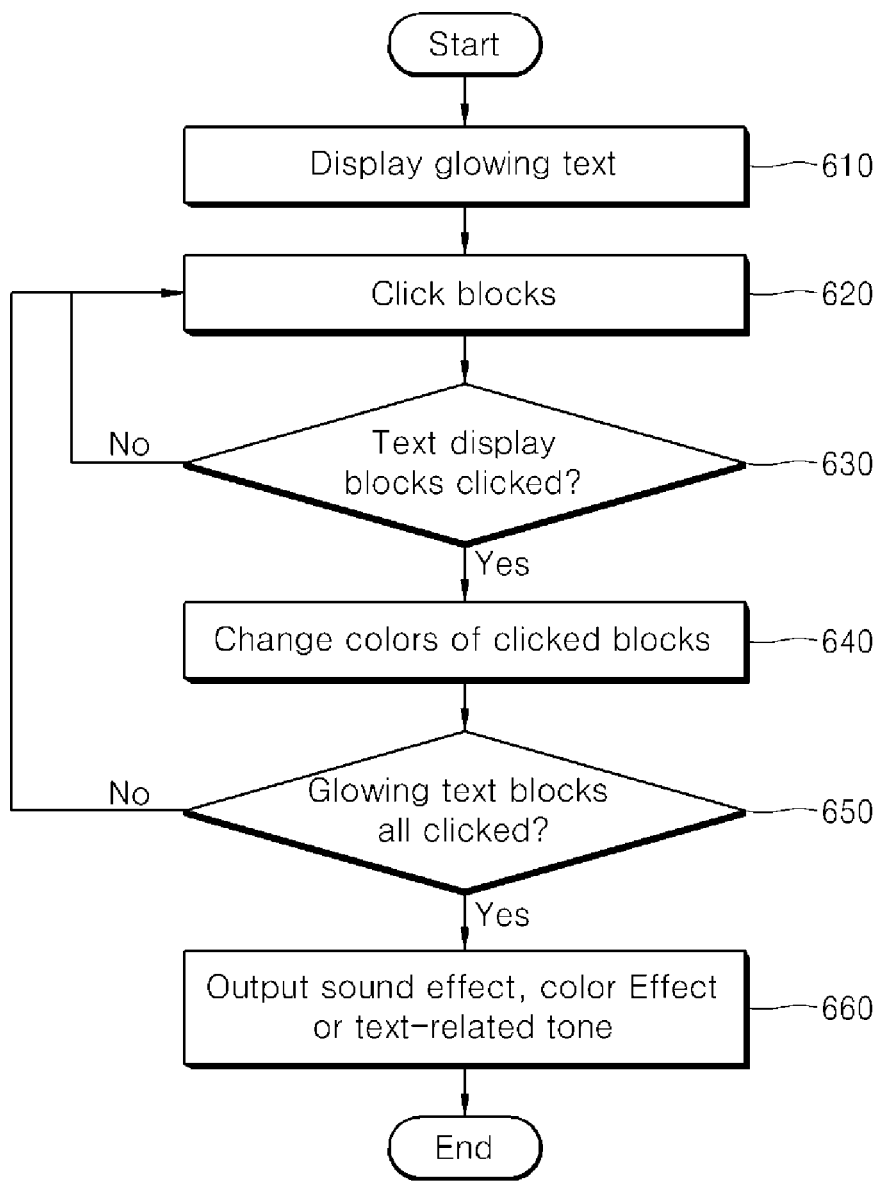

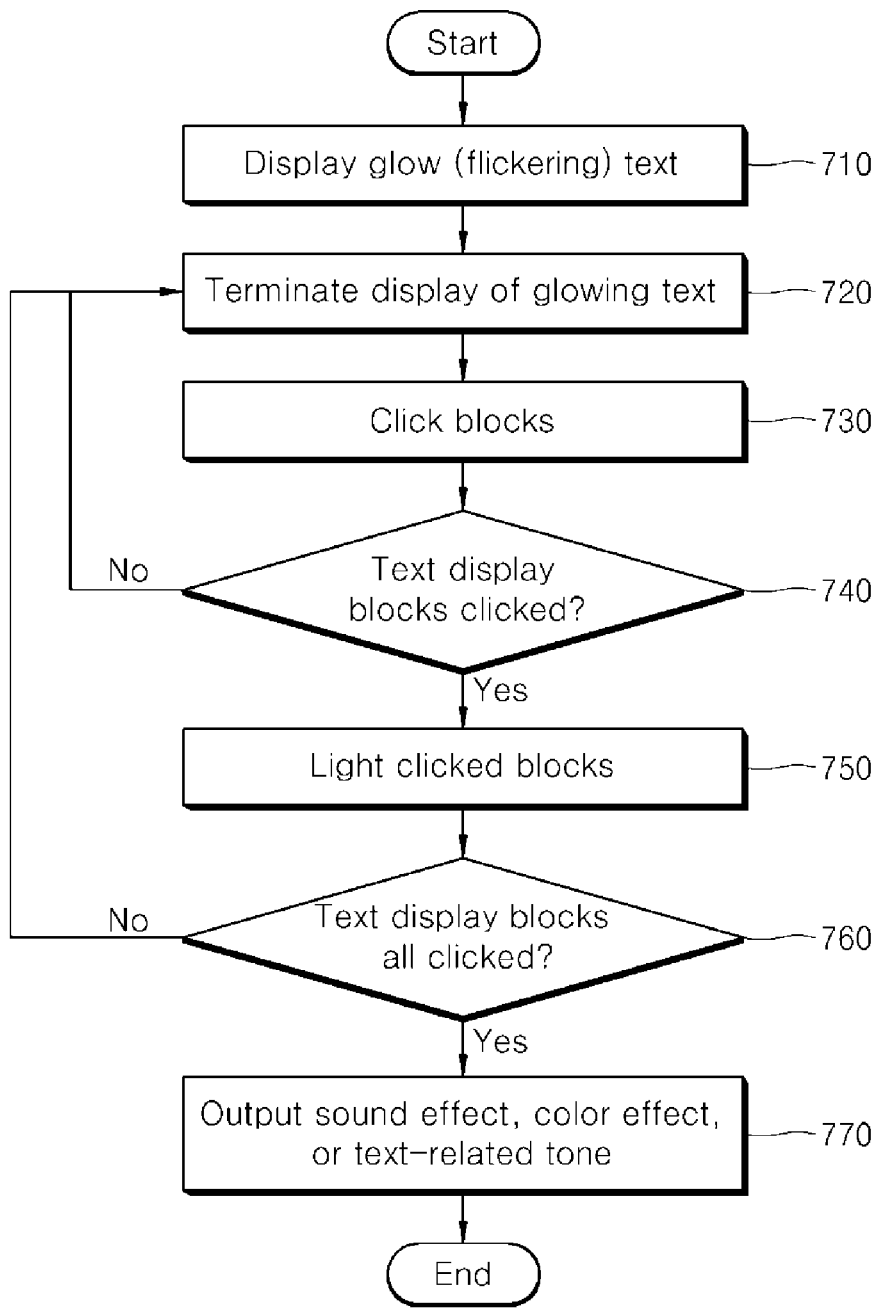

LED BLOCK DISPLAY APPARATUS FOR PROVIDING EDUCATIONAL FUNCTION AND CONTROL METHOD THEREOF

CROSS REFERENCE TO RELATED APPLICATION

This application claims the priority of Korean Patent Application No. 10-2012-0028700 filed on Mar. 21, 2012 in the KIPO (Korean Intellectual Property Office of the P.R.C). Further, this application is the National Phase application of International Application No. PCT/KR2012/008463 filed on Oct. 17, 2012, which designates the United States and was published in Korean.

TECHNICAL FIELD

The present invention relates to a display apparatus, and more particularly, to an LED block display apparatus for providing an educational function and a control method thereof.

BACKGROUND ART

A light emitting diode (LED) is a semiconductor device that generates light using a light emitting phenomenon by combination of electrons and holes. As a material of an LED chip, a compound semiconductor, such as GaN, GaAs, GaP, GaAsP, GaAlAs, SiC, InP, InGaP or the like, is used. An LED has advantages of high energy efficiency, low operating voltage, small size, and long lifespan.

Related art is disclosed in Korean Patent No. 0915118 (Title: Module Type LED Display Block, Registration Date: Aug. 26, 2009).

DISCLOSURE

Technical Problem

It is an aspect of the present invention to provide an LED block display apparatus for providing an educational function using LED blocks and a control method thereof.

The present invention is not limited to the above aspect, and from the following description, other aspects of the present invention will be clearly understood by those skilled in the art.

Technical Solution

In accordance with one aspect of the present invention, an LED block display apparatus for providing an educational function includes: a plurality of LED blocks including a plurality of color LEDs; and a controller providing a text completion function using the LED blocks, wherein the controller transmits a text display signal for displaying glowing text to the LED blocks such that text is displayed in a glowing state by the LED blocks; when the LED blocks related to the text display signal are clicked, the controller transmits a first color change signal for changing colors to the clicked LED blocks; and when colors of the LED blocks related to the text display signal are all changed, the control unit outputs a notification signal.

In accordance with another aspect of the present invention, an LED block display apparatus for providing an educational function comprises: a plurality of LED blocks including a plurality of color LEDs; and a controller providing a text completion function using the LED blocks, wherein the controller transmits a text display signal for displaying glowing (or flickering) text to the LED blocks, and transmits a text display termination signal for terminating display of the glowing (or flickering) text to the LED blocks, after a predetermined time, such that the LED blocks related to the text display signal is turned off; when the LED blocks related to the text display signal are clicked, the controller transmits a lighting signal to the clicked LED blocks; and when the LED blocks related to the text display signal are all lit, the controller outputs a notification signal.

The LED blocks may further include a touch sensor for sensing user touch, and the controller may receive a sensing signal from the touch sensor, and may determine whether the LED blocks related to the text display signal are clicked based on the sensing signal transmitted thereto.

The touch sensor may generate touch data using at least one of the number of user touch and touch time, and when the LED blocks related to the text display signal are clicked, the controller may transmit a second color change signal for changing the colors differently to the clicked LED blocks according to the generated touch data.

The notification signal may include a signal related to a sound effect, a color effect, or text-related tone.

The LED block display apparatus may further include a timer providing a time limit function until text completion.

In accordance with a further aspect of the present invention, a method of controlling an LED block display apparatus for providing an educational function including a plurality of LED blocks and a controller includes: transmitting a text display signal for displaying glowing text to the LED blocks such that text is displayed in a glowing state by the LED blocks; when the LED blocks related to the text display signal are clicked, transmitting a first color change signal for changing colors to the clicked LED blocks to change colors of the clicked LED blocks; and when colors of the LED blocks related to the text display signal are all changed, outputting a notification signal.

In accordance with a still further aspect of the present invention, a method of controlling an LED block display apparatus for providing an educational function including a plurality of LED blocks and a controller comprises: transmitting a text display signal for displaying glowing (or flickering) text to the LED blocks such that text is displayed in a glowing (or flickering) state by the LED blocks; after a predetermined time, transmitting a text display termination signal for terminating display of the glowing (or flickering) text to the LED blocks to turn off the LED blocks related to the text display signal; when the LED blocks related to the text display signal are clicked, transmitting a lighting signal to the clicked LED blocks to turn on the clicked LED blocks; and when the LED blocks related to the text display signal are all lit, outputting a notification signal.

The method may further include determining whether the LED blocks related to the text display signal are clicked based on a sensing signal generated from a touch sensor included in the LED blocks.

The method may further include, when the LED blocks related to the text display signal are clicked, transmitting a second color change signal for changing the colors differently to the clicked LED blocks according to touch data generated from the touch sensor to change the colors of the clicked LED blocks differently with respect to each of the touch data.

Details of other embodiments are included in the following detailed description and the accompanying drawings.

The objects, features and other advantages of the present invention will be more clearly understood from the following detailed description taken in conjunction with the accompanying drawings. However, the present invention is not limited to the following embodiments and may be embodied in different ways. Rather, the following embodiments are given by way of illustration only to provide thorough understanding of the invention to those skilled in the art. It should be understood that the scope of the invention should be limited only by the claims and equivalents thereof. Like elements are denoted by like reference numerals throughout the specification and drawings.

Advantageous Effects

According to the embodiments of the present invention, an educational function using the LED blocks can be provided.

DESCRIPTION OF DRAWINGS

FIG. 2a is a perspective view and side view illustrating an example of an LED block module according to one embodiment of the present invention.

FIG. 6 is a flowchart illustrating a method of controlling an LED block display apparatus for providing an educational function according to one embodiment of the present invention.

FIG. 7 is a flowchart illustrating a method of controlling an LED block display apparatus for providing an educational function according to another embodiment of the present invention.

BEST MODE

Hereinafter, embodiments of the present invention will be described in more detail with reference to the accompanying drawings.

Figure 1:
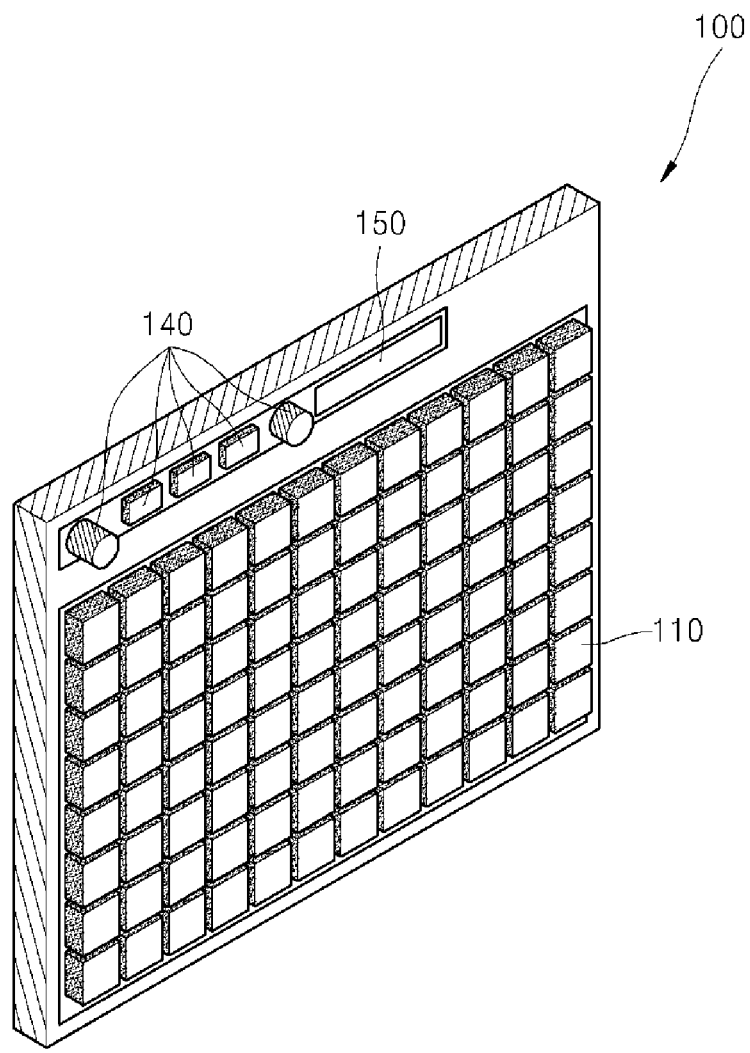
FIG. 1 is a perspective view of an LED block display apparatus for providing an educational function according to one embodiment of the present invention.

FIG. 1 is a perspective view of an LED block display apparatus for providing an educational function according to one embodiment of the present invention.

Referring to FIG. 1, an LED block display apparatus 100 according to one embodiment of the present invention may comprise at least one LED block 110, a controller (not shown), a manipulation unit 140, a display unit 150, a battery (not shown) and a sound output unit (not shown).

The LED block 110 may include at least one of a red LED, a green LED and a blue LED. In addition to the red LED, the green LED and the blue LED, the LED block 110 may include a variety of combinations of LEDs emitting light of various colors, such as yellow, amber, violet and the like. A touch sensor (not shown) for sensing user touch may be mounted to the LED block 110.

Figure 2B:
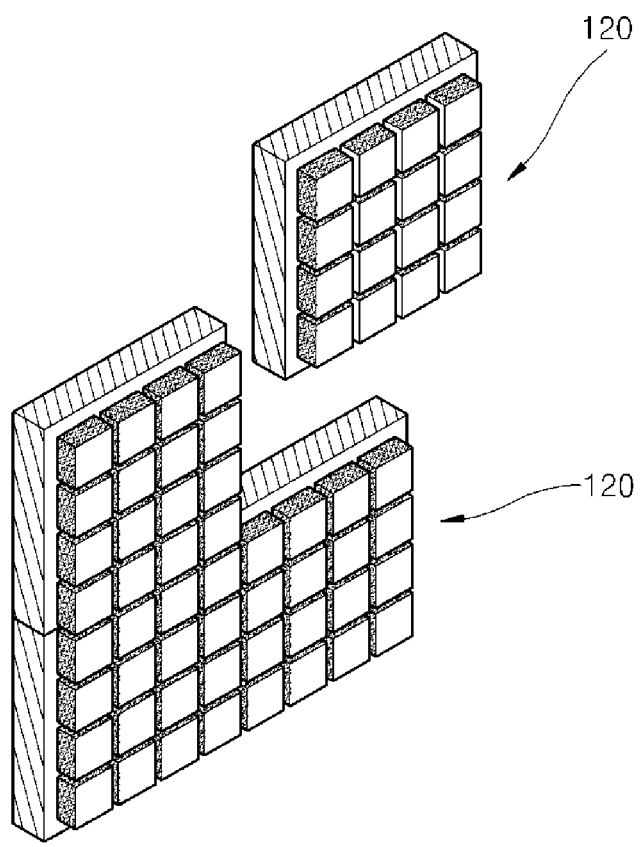
FIG. 2b is a perspective view illustrating an example of block modules coupled in a two-dimensional array according to one embodiment of the present invention.
Figure 2C:
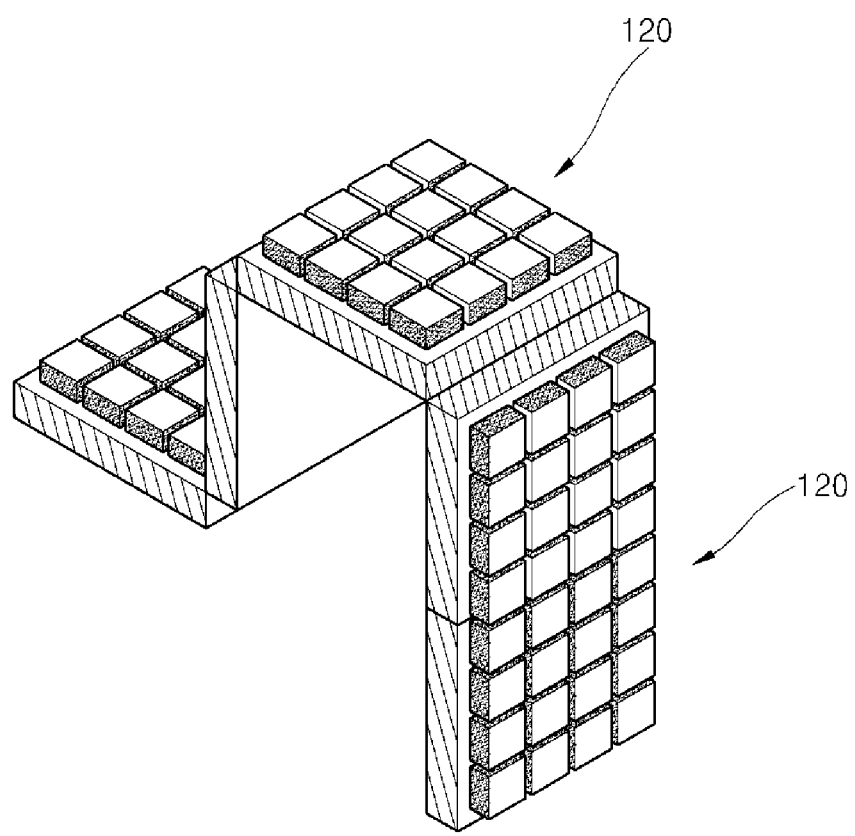
FIG. 2c is a perspective view illustrating an example of block modules coupled in a three-dimensional array according to one embodiment of the present invention.

A plurality of LED blocks 110 may be arranged to form an LED block module 120 as exemplarily shown in FIG. 2a. The LED block module 120 may be coupled to other block modules 120 in a two-dimensional array as exemplarily shown in FIG. 2b, or may be coupled to other block modules 120 in a three-dimensional array as exemplarily shown in FIG. 2c.

The controller adjusts color of the light emitted from the LEDs by controlling lighting of the LEDs mounted to the LED blocks 110. The controller also provides an educational function including a text completion function using the LED blocks 110. To this end, the controller controls operation, i.e., lighting, termination of lighting and color change of the LED blocks 110. The controller may provide an educational function in two ways.

The first way is as follows.

Figure 3:
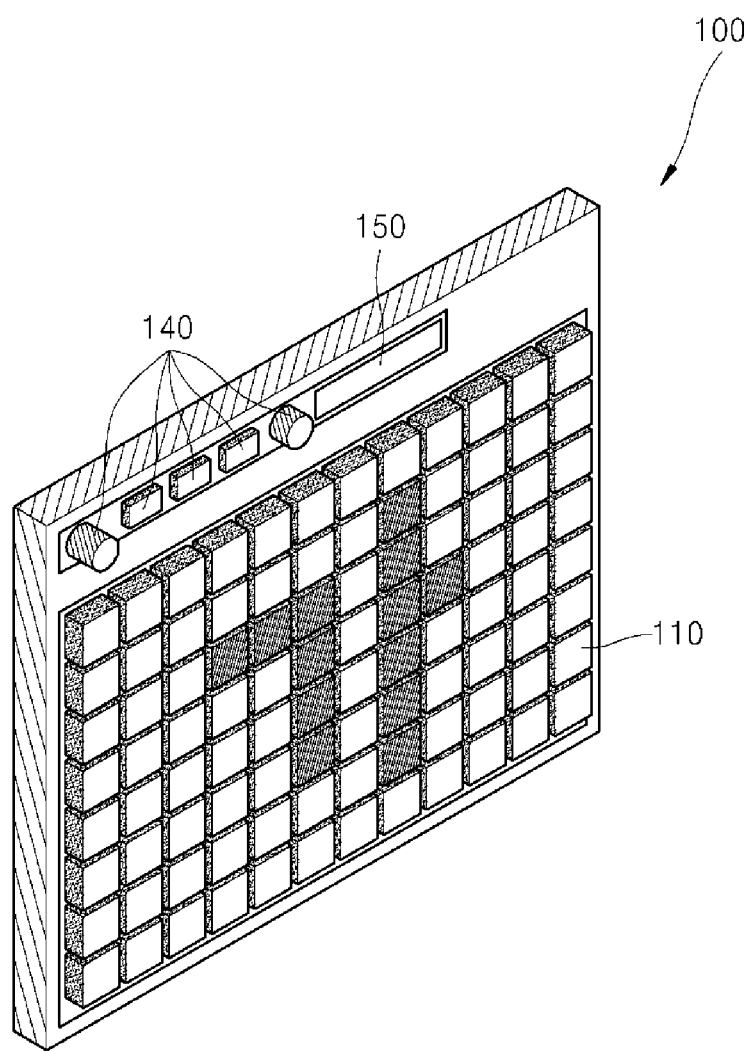
FIG. 3 is a view illustrating an example of an educational function using an LED block display apparatus according to one embodiment of the present invention.

The controller transmits a text display signal for displaying glowing text to the LED blocks 110 such that text is displayed in a glowing state by the LED blocks 110. For example, as shown in FIG. 3, in order to display '가' as the glowing text by the LED blocks 110, the controller transmits a text display signal for displaying the glowing text of '가' to the LED blocks 110.

When the LED blocks 110 related to the text display signal are clicked, the controller transmits a first color change signal for changing colors to the clicked LED blocks 110. At this time, the controller may receive a sensing signal from the touch sensor, and may determine whether the LED blocks 110 related to the text display signal are clicked based on the sensing signal transmitted thereto. When the LED blocks 110 related to the text display signal are not clicked and other LED blocks 110 are clicked, the controller may output an alarm signal (silent mode or specific sound: sound distinguished from button click sound) for indicating a click mistake.

When colors of the LED blocks 110 related to the text display signal are all changed, the controller outputs a notification signal. That is, when the LED blocks 110 related to the text display signal are all clicked, the controller outputs a notification signal. Herein, the notification signal may include a signal related to a sound effect, a color effect, or text-related tone.

The touch sensor may generate touch data using at least one of the number of user touch and touching time. When the LED blocks 110 related to the text display signal are clicked, the controller may transmit a second color change signal for changing the colors differently to the clicked LED blocks 110 according to the touch data. Accordingly, the clicked LED blocks 110 may change in different colors according to the number of user touch and touching time.

Next, the second way is as follows.

The controller transmits a text display signal for displaying glowing (or flickering) text to the LED blocks 110. After a predetermined time, the controller transmits a text display termination signal for terminating display of the glowing (or flickering) text to the LED blocks 110 to turn off the LED blocks 110 related to the text display signal. When the LED blocks 110 related to the text display signal are clicked, the controller transmits a lighting signal to the clicked LED blocks 110. When the LED blocks 110 related to the text display signal are all lit, the controller outputs a notification signal.

The manipulation unit 140 transmits a user manipulation signal to the controller, and preferably may include a plurality of buttons and dials.

The display unit 150 may display manipulation information, a display state, guidance information and the like.

In this embodiment, at least one of the manipulation unit 140 and the display unit 150 may be omitted.

The battery is a device for applying power to the LED block display apparatus 100 according to one embodiment of the present invention. In the case in which power is applied from an external power source, the battery may be omitted.

The sound output unit outputs a predetermined sound corresponding to adjustment of colors of the light emitted from the LED blocks 110.

As shown in FIG. 1, at least one of the controller, the manipulation unit 140, the display unit 150, the battery and the sound output unit may be manufactured integrally with at least one LED block 110 or at least one LED block module 120.

Figure 4:
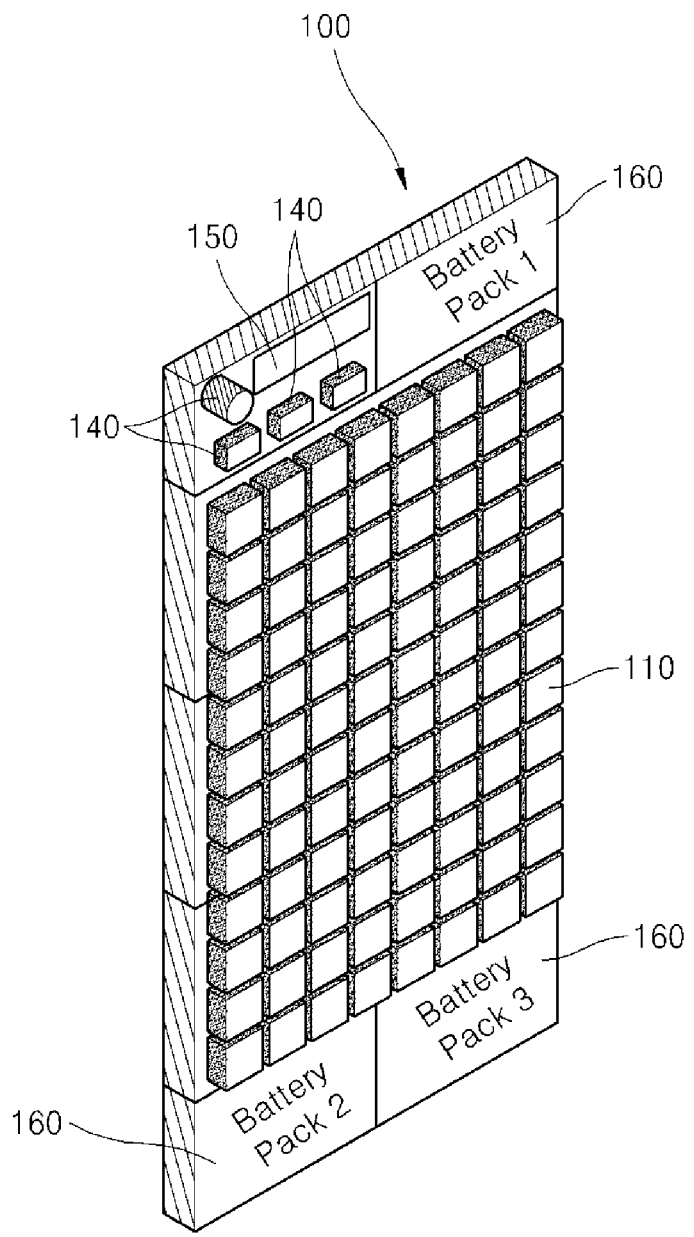
FIG. 4 is a perspective view of an LED block display apparatus for providing an educational function according to another embodiment of the present invention.

Alternatively, as shown in FIG. 4, at least one of the controller, the manipulation unit 140, the display unit 150, the battery 160 and the sound output unit may be manufactured separately from at least one LED block 110 or at least one LED block module 120.

In addition, although not shown in the drawings, the LED block display apparatus 100 according to one embodiment of the present invention may further include a timer. The timer may provide a time limit function until text completion. Further, the timer may measure the elapsed time from transmission of the text display signal until output of the notification signal by the controller (i.e., text completion time). When the time measured by the timer exceeds the time limit, the controller may output an alarm signal to indicate that time has run out.

Further, when a user completes text (writes text) using the LED blocks 110, the LED block display apparatus 100 according to one embodiment of the present invention may provide a function of checking the order or direction of strokes, a function of helping a user to write text by displaying the glowing text on the LED blocks by receiving the phonetic sound of the text, a function of recognizing wrong text as correct text even though the LED blocks are slightly erroneously clicked, and a function of giving a hint in such a way of showing a specific stroke in advance or showing the whole text for a short time.

Figure 5A:
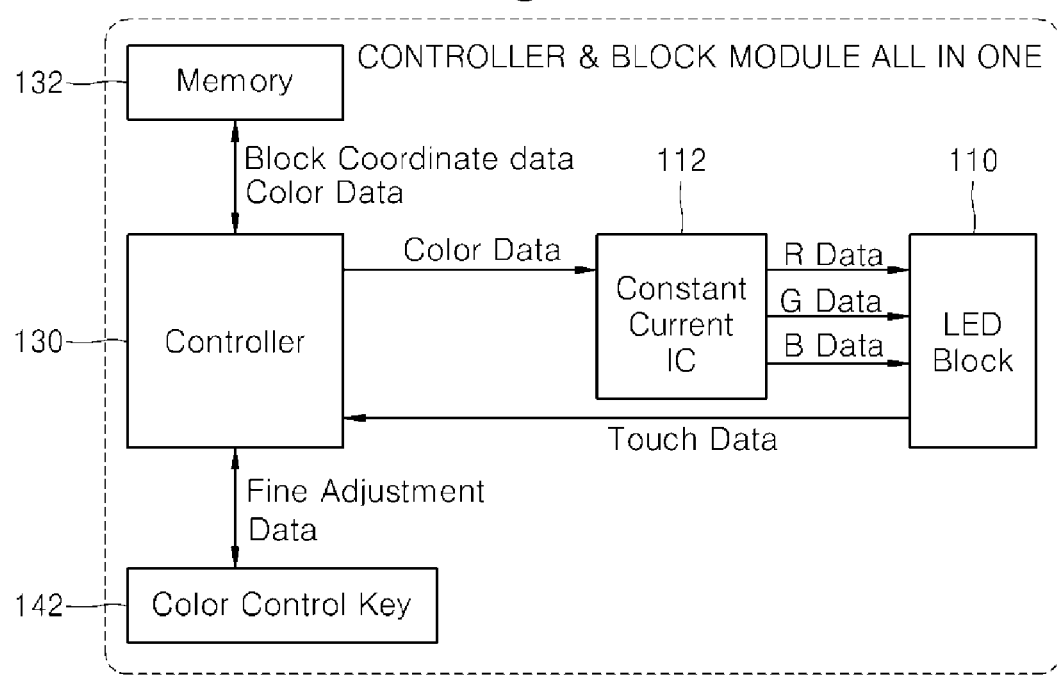
FIG. 5a is a block diagram schematically illustrating a function of an LED block display apparatus in which a controller and an LED block module are provided as an all-in-one system according to one embodiment of the present invention.
Figure 5B:
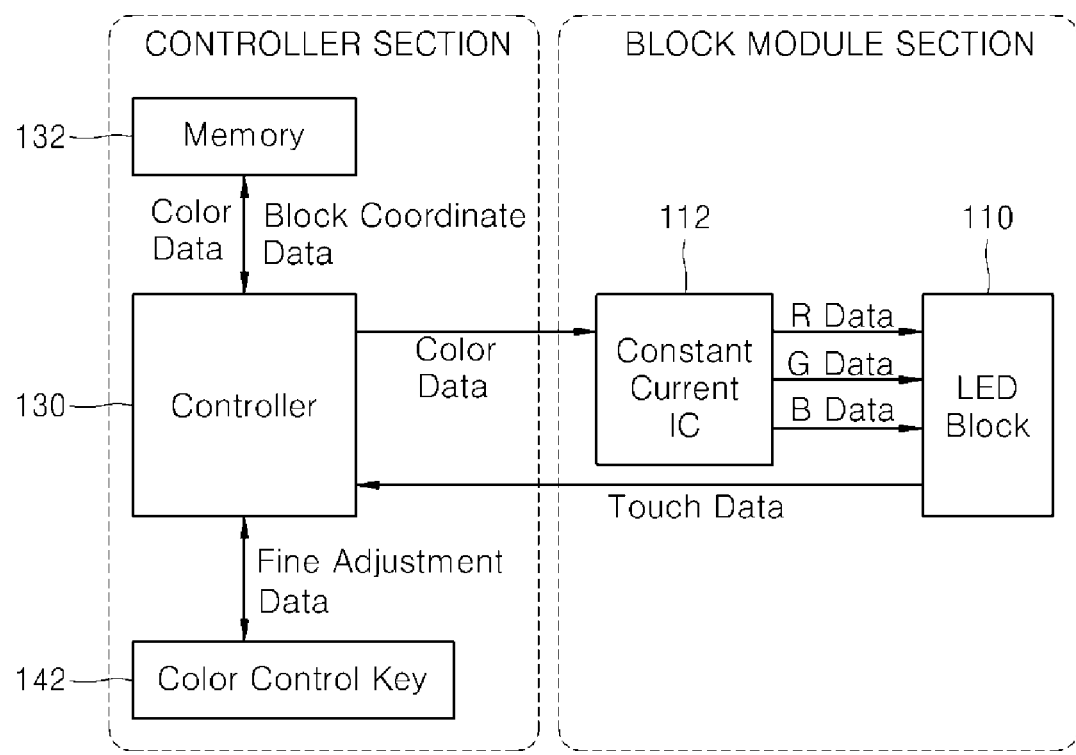
FIG. 5b is a block diagram schematically illustrating a function of an LED block display apparatus in which a controller and an LED block module are separately provided according to one embodiment of the present invention.

FIG. 5a is a block diagram schematically illustrating a function of the LED block display apparatus in which the controller and the LED block module are provided as an all-in-one system according to one embodiment of the present invention, and FIG. 5b is a block diagram schematically illustrating a function of the LED block display apparatus in which the controller and the LED block module are separately provided according to one embodiment of the present invention.

Referring to FIGS. 5a and 5b, the controller 130 may be individually mounted corresponding to each of the LED blocks 110 or may be individually mounted corresponding to each of the LED block modules 120. Also, the controller 130 may be individually mounted corresponding to the individual LED block modules 120 or may be independently mounted corresponding to the whole LED blocks 110.

The controller 130 may receive touch data generated by the touch sensor in response to touching of the LED blocks 110. The controller 130 may adjust colors of the light emitted from the LED blocks 110 via a constant current IC 112 by using the color data generated based on the touch data transmitted from the LED blocks 110. It is illustrated that the constant current IC 112 performs lighting in a static manner, however, the embodiments are not limited thereto. The constant current IC 112 may also perform lighting in a dynamic manner.

While controlling the light adjusted in color to be emitted from the LED blocks 110, the controller 130 may also control the sound output unit to output a predetermined sound. After adjusting primary colors based on the touch data, the controller 130 may also control the LED blocks 110 to emit the light finely adjusted in primary color based on fine adjustment data transmitted from a color control key 142 included in the manipulation unit 140.

Further, the controller 130 may adjust the primary colors based on the number of user touch to the LED blocks 110, and may finely adjust the primary colors based on the touching time. In addition, the controller 130 may control the sound output unit to output a predetermined sound at the same time as when controlling the light finely adjusted in primary color to be emitted from the LED blocks 110.

The LED block display apparatus 100 according to one embodiment of the present invention may further include a memory 132. The memory 132 may be a removable memory card. The memory 132 may be built in the controller 130. The color data corresponding to the light emitted from the LED blocks 110 may be stored in the memory 132. The color data stored in the memory 132 may be modified or edited, and may be read out by the controller 130 for use. The controller may receive the color data from the outside or transmit the color data to the outside through a communication device (not shown). When the controller 130 controls a plurality of LED blocks 110, the controller may receive or transmit the color data together with block coordinate data regarding the position of the specific LED block 110.

Figure 5C:
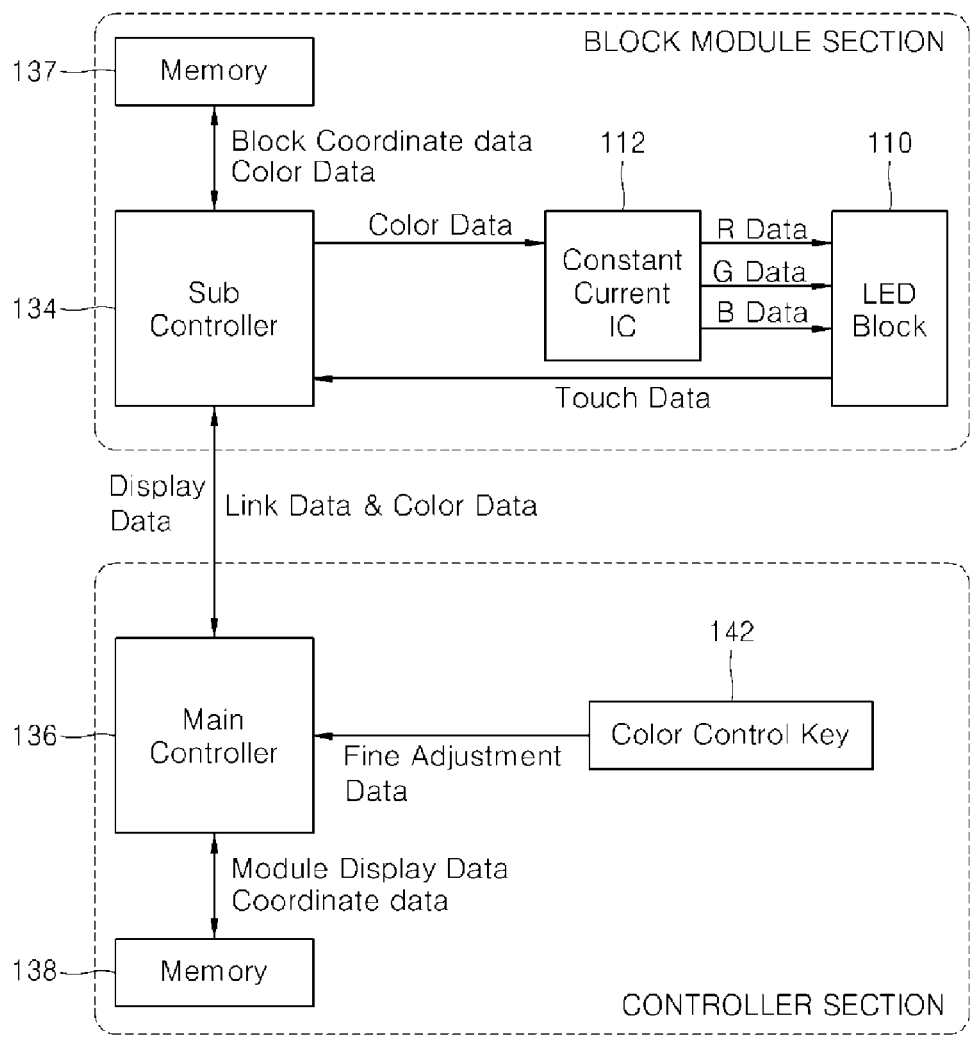
FIG. 5c is a block diagram schematically illustrating a function of an LED block display apparatus in which a controller and an LED block module are separately provided according to another embodiment of the present invention.

FIG. 5c is a block diagram schematically illustrating a function of the LED block display apparatus in which the controller and the LED block module are separately provided according to another embodiment of the present invention.

Referring to FIG. 5c, a sub-controller 134 for controlling the LED block module 120 and a memory 137 may be separately mounted in each LED block module section. A main controller 136, a memory 138 and a color control key 142 may be mounted in a controller section for controlling all of the LED block module sections.

The sub-controller 134 may receive touch data generated from the touch sensor by user touching of the LED blocks 110. The sub-controller 134 may adjust colors of the light emitted from the LED blocks 110 via the constant current IC 112 according to the display data transmitted from the main controller 136 by using the color data generated based on the touch data transmitted from the LED blocks 110. The sub-controller 134 may control the sound output unit to output a predetermined sound while controlling the light adjusted in color to be emitted from the LED blocks 110.

After adjusting the primary colors based on the touch data, the sub-controller 134 may control the LED blocks 110 to emit the light finely adjusted in primary color based on the fine adjustment data transmitted from the color control key 142 included in the controller section. Further, the sub-controller 134 may adjust the primary colors based on the number of user touch to the LED blocks 110, and may finely adjust the primary colors based on the touching time. In addition, the sub-controller 134 may control the sound output unit to output a predetermined sound while controlling the light finely adjusted in primary color to be emitted from the LED blocks 110.

The memory 137 may be a removable memory card. The memory 137 may be built in the sub-controller 134. The display data and/or color data corresponding to the light emitted from the LED blocks 110 may be stored in the memory 137. The display data and/or color data stored in the memory 137 may be modified or edited, and may be used by being read out by the sub-controller 134. The color data and link data regarding the connection relationship of the LED block modules 120 may be transmitted together to the main controller 136 of the controller section by the sub-controller 134.

The main controller 136 transmits the display data including contents and format displayed in each LED block module section to the sub-controller 134 of each LED block module section. The display data may be configured not to include the color data generated by the sub-controller 134 based on the touch data transmitted from the LED blocks 110. The display data may further include fine adjustment data transmitted from the color control key 142.

The main controller 136 may store module display data which is display data of each LED block module and block module coordinate data regarding the position of the specific LED block module 120 in the memory 138, or may read out the same from the memory 138. The main controller 136 may also store display data, which is data displayed on the LED block display apparatus including at least one LED block, in the memory 138. In addition, the main controller 136 may provide a function of modifying or editing display data to be displayed on the LED block display apparatus including at least one LED block. The function of modifying or editing the display data may include a function of adding various events to the display data. The display data, which is data displayed or generated from the LED block display apparatus according to the present invention, may be transmitted to the main controller from the outside or may be transmitted to the outside through a communication device (not shown).

Figure 5D:
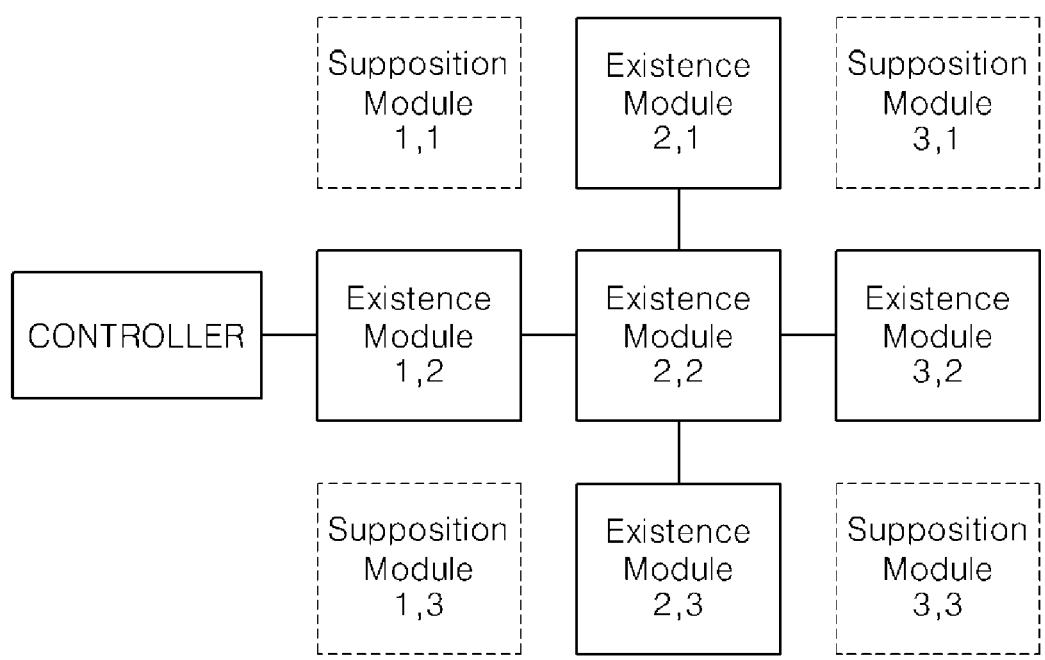
FIG. 5d is a block diagram schematically illustrating arrangement of LED block modules according to one embodiment of the present invention.

FIG. 5*d* is a block diagram schematically illustrating arrangement of the LED block modules according to one embodiment of the present invention.

Referring to FIG. 5*d*, when real LED block modules are not arranged in a rectangular shape, the controller may identify the correct positions of the real LED block modules by adding virtual LED block modules. In this embodiment, the real LED block modules are configured to achieve two-way communication, and each of the real LED block modules may transmit its own identification information to the controller through the communication function. By adding virtual LED block modules based on the identification information corresponding to each of the real LED block modules, the controller arranges the real LED block modules and the virtual LED block modules in a virtual rectangular shape, thereby identifying the correct position of each of the LED block modules.

FIG. 6 is a flowchart illustrating a method of controlling the LED block display apparatus for providing an educational function according to one embodiment of the present invention.

Referring to FIG. 6, the LED blocks display glowing text thereon in Step 610. For this, the controller transmits a text display signal for displaying the glowing text to the LED blocks.

Next, a user clicks (touches) the LED blocks in Step 620.

At this time, when a user clicks the text display blocks (LED blocks related to the text display signal) ("Yes" in Step 630), the controller changes colors of the clicked LED blocks in Step 640. For this, the controller transmits a first color change signal for changing colors to the clicked LED blocks.

On the other hand, when a user does not click the text display blocks ("No" in Step 630), a user clicks the LED blocks again.

Next, when a user clicks all glowing text blocks (LED blocks related to the text display signal) ("Yes" in Step 650), the controller outputs a notification signal such as a sound effect, a color effect, or text-related tone in Step 660. On the other hand, when a user does not click all glowing text blocks ("No" in Step 650), a user clicks the LED blocks again.

FIG. 7 is a flowchart illustrating a method of controlling the LED block display apparatus for providing an educational function according to another embodiment of the present invention.

Referring to FIG. 7, the LED blocks display glowing (or flickering) text thereon in Step 710. For this, the controller transmits a text display signal for displaying the glowing (or flickering) text to the LED blocks.

Next, the LED blocks terminate the glowing text display in Step 720. For this, the controller transmits a text display termination signal for terminating display of the glowing (or flickering) text to the LED blocks.

Next, a user clicks (touches) the LED blocks in Step 730.

At this time, when a user clicks the text display blocks (LED blocks related to the text display signal) ("Yes" in Step 740), the controller turns on the lighting function of the clicked LED blocks in Step 750. For this, the controller transmits a lighting signal to the clicked LED blocks.

On the other hand, when a user does not click the text display blocks ("No" in Step 740), a user clicks the LED blocks again.

Next, when a user clicks all text display blocks (LED blocks related to the text display signal) ("Yes" in Step 760), the controller outputs a notification signal such as a sound effect, a color effect, or text-related tone in Step 770. On the other hand, when a user does not click all text display blocks ("No" in Step 760), a user clicks the LED blocks again.

The embodiments of the present invention include computer readable media having program instructions for performing operations realized by a variety of computer devices. The computer readable media may include program instructions, local data files and local data structures, alone or in combination. Media specially designed and constructed for the present invention may be used, or media known to those skilled in the field of computer software may be used. The computer readable recording media may include magnetic media such as hard disks, floppy disks and magnetic tapes, optical recording media such as CD-ROMs and DVDs, magneto-optical media such as floptical discs, and hardware devices, such as ROM, RAM and flash memory, which are specially designed to store and carry out program instructions. The program instructions may include not only a machine language code generated by a compiler but also a high level language code which can be carried out by a computer using an interpreter, etc.

Although some embodiments of the present invention have been shown and described, it would be appreciated by those skilled in the art that changes may be made in these embodiments without departing from the principles and spirit of the invention as defined in the claims and their equivalents.

Although some embodiments have been disclosed, it should be understood that these embodiments are provided for illustration only and are not to be construed in any way as limiting the present invention. In addition, it should be understood that the invention is to cover all modifications, equivalents, and alternatives within the spirit and scope of the invention as defined by the claims.

The invention claimed is:

1. An LED block display apparatus for providing an educational function, comprising:
    a plurality of LED block modules each including a plurality of LED blocks, each LED block among the plurality of LED blocks including a plurality of color LEDs; and
    a controller configured to provide a text completion function using the LED blocks,
    wherein
    the LED block modules are physically couplable to each other in a plurality of different configurations,
    the controller is configured to transmit a text display signal for displaying glowing text to the LED blocks to cause the LED blocks to display text in a glowing state,
    when the LED blocks related to the text display signal are clicked, the controller is configured to transmit a first color change signal for changing colors to the clicked LED blocks, and
    when colors of the LED blocks related to the text display signal are all changed, the control unit is configured to output a notification signal.

2. The LED block display apparatus according to claim 1, wherein
    the LED blocks further include a touch sensor for sensing user touch, and
    the controller is configured to
        receive a sensing signal from the touch sensor, and
        determine whether the LED blocks related to the text display signal are clicked based on the sensing signal transmitted thereto.

3. The LED block display apparatus according to claim 2, wherein
    the touch sensor is configured to generate touch data using at least one of the number of user touch and touching time, and
    when the LED blocks related to the text display signal are clicked, the controller is configured to transmit a second color change signal for changing the colors differently to the clicked LED blocks according to the generated touch data.

4. The LED block display apparatus according to claim 1, wherein
    the notification signal includes a signal related to a sound effect, a color effect, or text-related tone.

5. The LED block display apparatus according to claim 1, further comprising:
    a timer configured to provide a time limit function until text completion.

6. A method of controlling an LED block display apparatus of claim 1, for providing an educational function, the display apparatus including a plurality of LED blocks and a controller, the method comprising:
    transmitting a text display signal for displaying text to the LED blocks to cause the LED blocks to display text;
    transmitting a text display termination signal for terminating display of the text to the LED blocks; and
    after terminating display of the text,
    when the LED blocks related to the text display signal are clicked, transmitting a signal to the clicked LED blocks to turn on the clicked LED blocks; and
    when the LED blocks related to the text display signal are all turned on, outputting a notification signal.

7. The method according to claim 6, further comprising:
    determining whether the LED blocks related to the text display signal are clicked based on a sensing signal generated from a touch sensor included in the LED blocks.

8. The LED block display apparatus according to claim 1, wherein
    adjacent LED blocks among the plurality of LED blocks are physically spaced from each other by a gap.

9. The LED block display apparatus according to claim 8, wherein
    the adjacent LED blocks among the plurality of LED blocks are clickable independently from each other.

10. The LED block display apparatus according to claim 1, wherein
    in at least one configuration among the plurality of different configurations,
        the LED blocks of a first LED block module among the plurality of LED block modules are arranged in a first plane,
        the LED blocks of a second LED block module among the plurality of LED block modules are arranged in a second plane, and
        the first plane is different from the second plane.

11. The LED block display apparatus according to claim 10, wherein
    the first plane is perpendicular to the second plane.

* * * * *